(12) United States Patent
Reid

(10) Patent No.: US 8,930,114 B1
(45) Date of Patent: Jan. 6, 2015

(54) ELECTRONIC ANTI-LOCK TRAILER BRAKING SYSTEM

(76) Inventor: Brian Reid, Eugene, OR (US)

(*) Notice: Subject to any disclaimer, the term of this patent is extended or adjusted under 35 U.S.C. 154(b) by 1145 days.

(21) Appl. No.: 12/372,102

(22) Filed: Feb. 17, 2009

(51) Int. Cl.
*B60T 7/12* (2006.01)
*G05D 1/00* (2006.01)
*G06F 7/00* (2006.01)
*G06F 17/00* (2006.01)

(52) U.S. Cl.
USPC ............. 701/83; 701/70; 701/71; 701/74; 701/81; 340/431; 280/204

(58) Field of Classification Search
USPC ............ 701/70, 71, 74, 81; 188/2, 3, 21, 22, 188/112, 115–118, 120–123, 137; 340/431; 361/238; 280/407.1, 411.1, 418.1, 280/423.1, 837–839, 901, 202, 204, 427, 280/428, 656, 789, 400; 180/244, 275; 303/7, 121, 123, 124, 138, 166, 303/168–175

See application file for complete search history.

(56) References Cited

U.S. PATENT DOCUMENTS

| | | | | |
|---|---|---|---|---|
| 4,232,910 | A | * | 11/1980 | Snyder ........................ 303/123 |
| 4,472,778 | A | | 9/1984 | Davis et al. |
| 5,011,236 | A | | 4/1991 | Toepfer et al. |
| 5,039,173 | A | * | 8/1991 | Emig et al. ...................... 303/7 |
| 5,085,489 | A | | 2/1992 | Emig et al. |
| 5,333,940 | A | | 8/1994 | Topfer |
| 5,518,308 | A | * | 5/1996 | Sugawara ..................... 303/169 |
| 5,582,275 | A | | 12/1996 | Arnold |
| 5,620,236 | A | * | 4/1997 | McGrath et al. ................ 303/7 |
| 6,176,555 | B1 | * | 1/2001 | Semsey ............................ 303/7 |
| 6,273,522 | B1 | * | 8/2001 | Feetenby et al. ................. 303/7 |
| 6,553,284 | B2 | * | 4/2003 | Holst et al. ...................... 701/1 |
| 6,655,754 | B2 | | 12/2003 | Crombez et al. |
| 6,668,225 | B2 | * | 12/2003 | Oh et al. ........................ 701/70 |
| 7,114,787 | B2 | | 10/2006 | Mederer et al. |
| 7,216,026 | B2 | * | 5/2007 | Heuer ............................ 701/70 |
| 7,798,263 | B2 | * | 9/2010 | Tandy et al. ................. 180/14.6 |
| 2001/0038239 | A1 | | 11/2001 | Ehrlich et al. |
| 2004/0119334 | A1 | * | 6/2004 | Lenz et al. ..................... 303/146 |
| 2006/0076827 | A1 | * | 4/2006 | Albright et al. ............... 303/123 |
| 2007/0257549 | A1 | | 11/2007 | Tandy, Jr. et al. |
| 2007/0260384 | A1 | | 11/2007 | Romanchok et al. |
| 2007/0260385 | A1 | * | 11/2007 | Tandy et al. .................... 701/70 |
| 2007/0260386 | A1 | | 11/2007 | Tandy, Jr. et al. |
| 2008/0067862 | A1 | * | 3/2008 | Parrott et al. ..................... 303/7 |
| 2009/0118960 | A1 | * | 5/2009 | Harrison ........................ 701/71 |

FOREIGN PATENT DOCUMENTS

| | | | | |
|---|---|---|---|---|
| EP | 0357983 A2 | 3/1990 | | |
| JP | 2000025645 A | * | 1/2000 | ............ B62D 11/08 |
| WO | WO 2005/005200 A2 | 1/2005 | | |

OTHER PUBLICATIONS

Bibliographic information and English Abstract for EP0357983, published Mar. 14, 1990; Applicant: Daimler Benz AG.

* cited by examiner

*Primary Examiner* — Rami Khatib
(74) *Attorney, Agent, or Firm* — Marger Johnson & McCollom, PC

(57) ABSTRACT

Disclosed is an antilock braking system for trailers equipped with electric brakes. A control module captures wheel speed data, analyzes it, and determines if wheel slip is occurring. Braking signal to the trailer wheels is reduced using pulse width modulation techniques to reduce the braking force as necessary to eliminate wheel slip. A particular system uses a central microprocessor, two hall-effect speed sensors, and three solid state relays for isolation and control. The ABS works in conjunction with an existing trailer brake controller installed in the tow vehicle.

24 Claims, 4 Drawing Sheets

ELECTRONIC ANTI-LOCK TRAILER BRAKING SYSTEM

TECHNICAL FIELD

This disclosure relates to anti-lock brakes, and, more particularly, to an electronic anti-lock braking system for trailers.

BACKGROUND

Antilock Braking Systems (ABS) were originally invented for the aviation industry to prevent wheel skid during landings. Early ABS systems were hydraulic. Problems with wheel speed systems, such as inability to operate reliably on rough terrain, during cornering, when fouled with contaminants, or when exposed to high heat prevented ABSs from being implemented in automobiles.

With the introduction of solid state devices and digital electronics, ABS technology rapidly progressed and by 1978, Mercedes-Benz introduced the first automobile ABS with electronic wheel speed sensors and hydraulic control valves.

Modern ABSs normally include one to four wheel speed sensors and sensor rings, a hydraulic control unit, an antilock brake controller, a brake proportioning valve, and an ABS warning lamp.

The antilock brake controller collects wheel speed sensor data and, using a proprietary control algorithm in conjunction with the sensor data, determines when wheel lockup is imminent. The measured amount of wheel deceleration is known as slip. A wheel that spins freely has zero slip and a locked wheel has 100% slip. Automotive engineers have determined through testing that 10-20% slip is most effective in maximizing braking force and reducing stopping distance.

When a wheel's speed begins spinning slower than vehicle speed, the ABS enters what is known as "hold" mode. In hold mode, the system prevents any increase in hydraulic pressure at the affected wheel and the line pressure is held at its current level. If the wheel continues to decelerate too quickly while the system is in hold mode, the ABS controller then begins reducing hydraulic line pressure until zero slip occurs. When zero slip is reached, the pressure decrease stops and the existing pressure level maintained. This is known as "release" mode.

While in release mode, the ABS begins to increase pressure to the wheel until slip occurs. Once the desired amount of slip is reached, pressure increases cease and the existing pressure level is maintained. This is known as "apply" mode. If the amount of slip exceeds the desired level while the system is in apply mode, the system returns to hold mode and the cycle repeats.

These frequent pressure decreases and increases that occur to maintain the desired slip during an emergency stop are responsible for the brake pedal pulsations normally associated with modern ABS.

All types of antilock braking systems operate like a conventional hydraulic braking system during normal operation. However, during severe braking, the manner in which the ABS controls line pressure and corrects for excessive slip varies from system to system. ABS can be integrated or independent, two-wheel or four-wheel, and one, two, three, or four channel.

Two wheel systems typically provide antilock capabilities only to the rear wheels and are most often found on pickup trucks and sport utility vehicles manufactured in the early 1990's. Because a large percentage of a vehicle's weight is transferred to the front wheels during heavy braking, the rear wheels are more likely to lock up under heavy braking.

Two wheel systems can be either one channel or two, depending on the number of speed sensors present. In one channel systems, both rear brakes are controlled by the ABS at the same time to control slip. Rear wheel speed is determined by a single speed sensor normally located above the rear differential ring gear, transfer case, or transmission.

Two channel systems utilize two speed sensors, one at each wheel, to determine and control slip of each rear wheel independently. This improves system performance when compared to a one channel system but because the hydraulic pressure at each of the front wheels is not controlled by the ABS, loss of vehicle control can occur if the steering wheels reach 100% slip.

As the name implies, three channel systems utilize three sensors, one at each of the front wheels and a third for both of the rear wheels. The hydraulic pressure at each of the front wheels is independently controlled by two separate hydraulic circuits, while a third hydraulic circuit controls both of the rear wheels.

True four wheel antilock brake systems utilize four individual hydraulic circuits and four speed sensors to control the slip of each wheel independent of the other wheels. This "full" system ensures each wheel receives the exact hydraulic pressure required to maintain maximum braking force while maintaining the desired level of slip and is the most effective ABS currently available.

An independent system uses a conventional hydraulic master cylinder and brake booster along with a separate ABS hydraulic control unit in the brake lines between the master cylinder and wheels. An integrated system replaces the traditional master cylinder with a single hydraulic unit that provides both conventional braking as well as ABS.

All of the systems described above are hydraulic systems, using various wheel sensors as input to a master controller that modulates hydraulic pressure to control braking.

Integrated hydraulic systems such as those described above work well because they are designed as complete systems. Expanding existing ABSs to include other systems, such as trailer braking systems, has been ineffective because of the vast variety of different systems and manufacturers.

Embodiments of the invention address these and other limitations in the prior art.

DETAILED DESCRIPTION OF THE EMBODIMENTS

Embodiments of the invention are directed toward a "plug-in" antilock brake controller for trailers equipped with electrically actuated brakes. The system includes a microcontroller for the ABS logic and system control, wheel speed sensors, solid state relays, and other electrical components as described below. The trailer ABS module works in conjunction with an existing electronic trailer brake controller in a tow vehicle.

Figure 1:
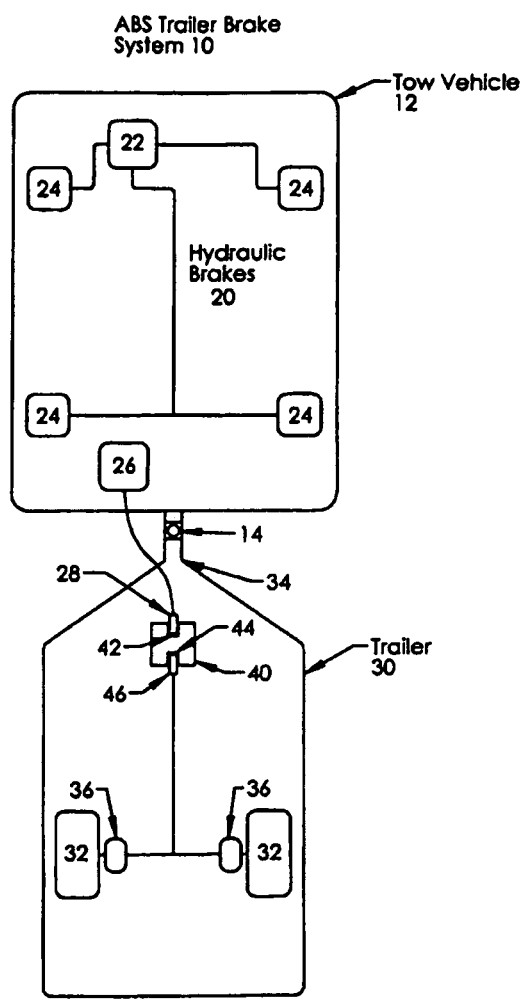
FIG. 1 is a block diagram illustrating components of an antilock braking system coupled to a towing vehicle according to embodiments of the invention.

FIG. 1 illustrates an example implementation of an ABS trailer brake system 10 according to embodiments of the invention. A tow vehicle 12 includes a towing connection 14 on which a trailer tongue 34 is connected. The tow vehicle 12 includes a set of hydraulic brakes 20 including a master brake cylinder 22 and one or more slaves 24 at each wheel. In operation the driver of the tow vehicle 12 presses on a brake pedal to actuate the master cylinder 22 which in turn applies hydraulic pressure to the slaves 24, which in turn are connected to brake pads to apply friction to the wheels of the tow vehicle. As the pressure on the master cylinder 22 increases, so does the friction applied to the wheels of the tow vehicle 12 to slow down or stop the vehicle.

A trailer 30 couples to the tow vehicle 12 through the tongue 34. The trailer 30 includes at least two wheels 32, at least one of which includes an electric brake 36.

In a standard, prior art system, the tow vehicle 12 includes a standard electric trailer brake controller 26 that plugs into a mating plug on the trailer 30. The standard trailer brake controller 26 provides braking signals that drive the electric trailer brakes 36 on the trailer 30. In other words, as the driver of the tow vehicle 12 presses on the hydraulic brake 20, the standard trailer brake controller 26 generates an electric signal to cause the trailer brakes 36 to engage as well. Typically the standard trailer brake controller 26 generates a signal in which an amount of electrical current increases as the tow vehicle 12 (or trailer 30) decelerates. This increased electrical current then correspondingly applies more force to the trailer brakes 36. Because the standard trailer brake controller 26 does not make accommodations for trailer weight, or other variables, the same brake control signal may cause the wheels on the trailer 30 to skid or not depending on such variables.

Differently, in the described inventive system, the trailer 30 includes a modular anti-lock braking system controller 40. In some embodiments the ABS system controller 40 includes a receptacle 42 to accept a standard output plug 28 from the standard trailer brake controller 26 as one of the inputs to the ABS system controller 40. Similarly, such ABS system controllers 40 also include an output plug 44 to which a trailer brake plug 46 connects. In other words, in a typical system the standard output plug 28 from the tow vehicle plugs directly into the trailer brake plug 46. In the inventive system, the tow vehicle standard output plug 28 instead plugs into the ABS system controller 40, which in turn plugs into the trailer brake plug 46. As described below, the ABS system controller 40 accepts a braking input from the standard brake controller 26, modulates it into an ABS braking output, if necessary, then applies the modified signal to control the electric trailer brakes 36 on the trailer 30.

Figure 2:
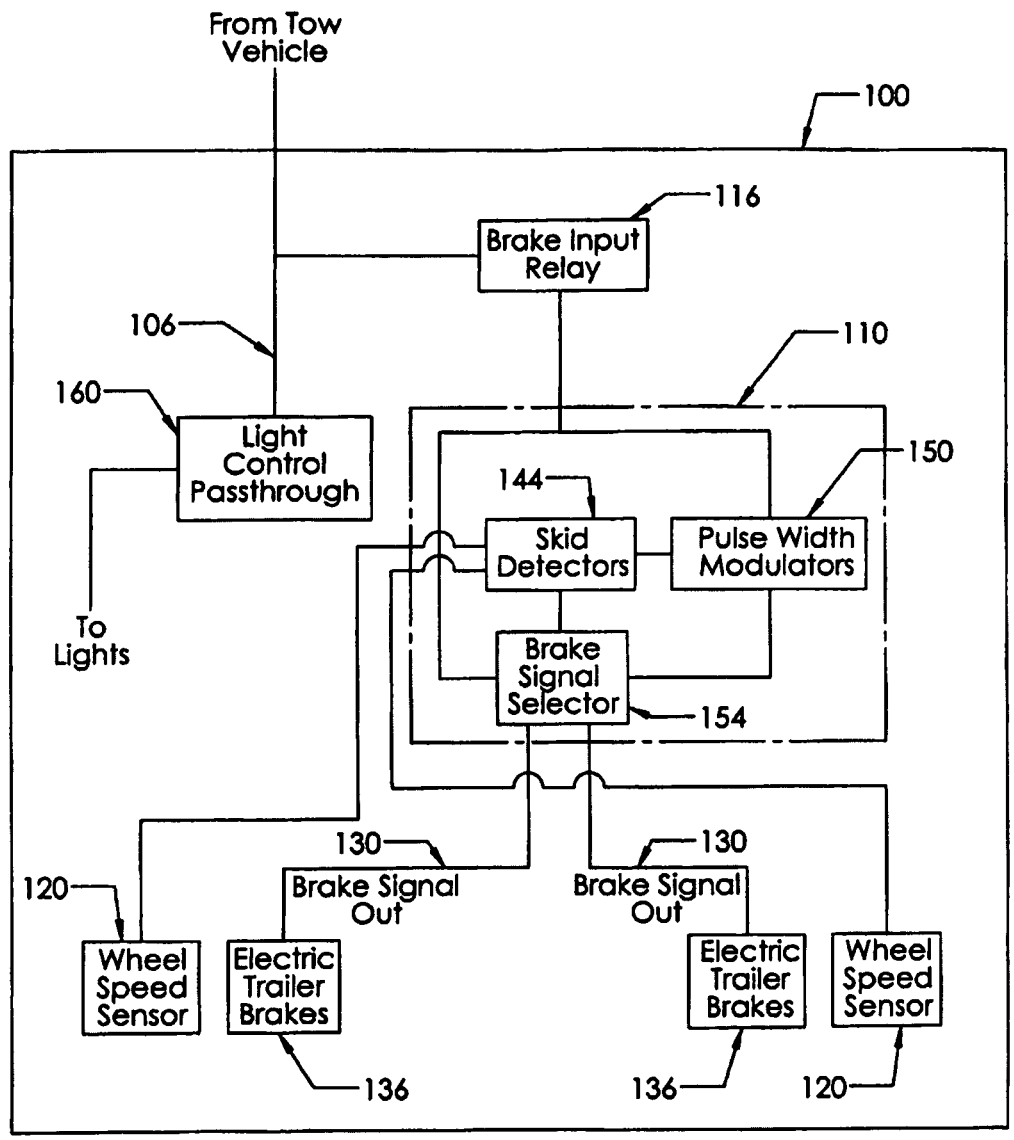
FIG. 2 is a functional block diagram of an antilock braking system controller according to embodiments of the invention.

FIG. 2 is a functional block diagram illustrating components of an ABS trailer brake system 100, which can include a system controller similar to the controller 40 of FIG. 1, according to embodiments of the invention. In brief, the ABS trailer brake system 100 includes a controller 110, brake input relay 116, wheel speed sensors 120, one or more ABS trailer brake signal outputs 130, and a light control 160.

In FIG. 2, particular functions are illustrated as functional blocks. The controller 110 accepts a brake control signal from the tow vehicle 12, either directly through a tow vehicle input 106 or through a brake input relay 116, described in more detail below. The controller 110 itself includes one or more skid detectors 144, one or more brake signal modulators, here illustrated as Pulse Width Modulators (PWM) 150, and a brake signal selector 154. The brake signal selector 154 determines which signal will be sent as the output brake signal 130 to the individual trailer brakes 136.

Further, a light control passthrough 160 may be included either inside or outside the controller 110. A typical electrical connection between a trailer 30 and tow vehicle 12 includes not only the brake signal, described above, but also signals to control the turn signals, running lights and brake lights of the trailer. The ABS system 100 described herein simply passes through those light signals from the tow vehicle input 106 to the appropriate trailer connections, and modifies only the brake signal from the tow vehicle 12 if necessary.

In an example system, the controller 110 can be implemented by an Analog Devices ADuC831 programmable microcontroller, which is an Intel 8052 derivative based 8-bit microcontroller. The ADuC831 microcontroller runs at 16 MHz and is equipped with eight self-calibrating analog inputs, two 12-bit analog outputs, two flexible Pulse Width Modulation (PWM) outputs, onboard temperature monitoring, and 34 general purpose I/O pins. Of course the controller 110 could also be embodied as a collection of separate circuits, as an Application Specific Integrated Circuit (ASIC), or as a programmed general purpose computer, for instance.

The wheel speed sensors 120 can be implemented by Cherry GS1007 hall-effect speed sensor, which is a sensor capable of operating on 4.5-24 VDC that provides a TTL compliant digital step from 0.1 VDC to 5 VDC.

As illustrated in and described with reference to FIGS. 1 and 2, the ABS system controller 100 is removably wired into the trailer brake system between the existing trailer electric brake controller 26 and the electric trailer brakes 36.

Generally, in operation, the skid detector 144 of the control module 110 monitors wheel speed of the trailer wheels by accepting inputs from the wheel speed sensors 120. During braking, if excess wheel slip is noted, the PWM modulator 150 reduces the amount of power delivered to the trailer brakes to prevent trailer wheel lockup while maximizing the braking force of each wheel. In most embodiments the ABS brake system 100 is not responsible for generating power to the trailer brakes when the trailer wheels are braking normally (without skidding), which instead comes from the electric trailer brake controller 26 on the tow vehicle 12. Instead, the ABS brake system 100 reduces the power output to the trailer brakes 36 from the trailer brake controller 26 as necessary to prevent trailer wheel lockup. In other embodiments the ABS brake system 100 generates the original brake signal based on another input, such as a brake light signal from the tow vehicle 12, from an accelerometer on the tow vehicle or on the trailer itself, and/or from a pressure sensor mounted between the trailer 30 and the tow vehicle. In such an embodiment the ABS brake system 100 generates both the standard brake signal and the anti-lock brake signal, determines which brake signal to apply, then applies the appropriate signal to the trailer brakes 36.

Figure 3:
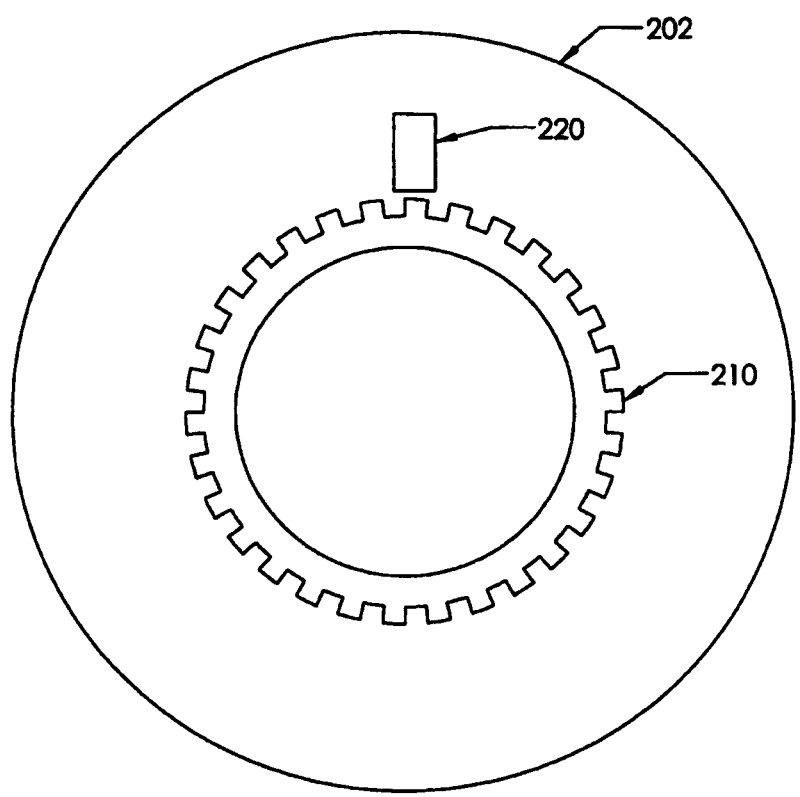
FIG. 3 is a drawing illustrating an example wheel speed sensor system according to embodiments of the invention.

FIG. 3 illustrates an embodiment of the wheel speed sensor 120 of FIG. 2. To determine how fast the trailer wheels are spinning, speed sensors 120 generate a signal that has an oscillation frequency directly proportional to the speed of wheel rotation. In some embodiments Hall-effect sensors can be used as a part of the speed sensors 120. Hall-effect and inductive speed sensors use a rotating ferrous target. In the system illustrated in FIG. 3, an iron tooth wheel 210 is coupled directly to a trailer wheel 202. An inductive pickup or sensor 220 senses the closeness of the tooth wheel 210 and generates a corresponding signal. When the trailer wheel 202 rotates, each tooth of the tooth wheel 210 passes near the inductive sensor 220 which, in turn, reports the closeness by modulating an electrical signal. When the wheel 202 is spinning, the signal from the inductive sensor 220 is a sine wave having a frequency directly related to the speed of rotation. As the wheel 202 spins faster, the frequency of the sine wave increases. During braking, the frequency of the sine wave decreases, and during a skid, the frequency of the sine wave from the inductive sensor 220 is essentially zero.

Because analyzing an analog sine wave in a digital system may be imprecise, it may be advantageous to convert the analog signal from the wheel speed sensor 120 to a digital signal, such as a square wave, before supplying the speed signal to the skid detector 144. Or, in another embodiment a particular inductive sensor 220 may be chosen that directly creates a digital signal as the tooth wheel 210 spins by generating a first logic signal when a sensor ring gear tooth passes in front of the sensor and generates a second logic signal when there is no ferrous target within range of the sensor. Because in some embodiments the skid detector 144 counts pulses to determine wheel speed, the fact that the digital signal may be "inverted," i.e., it is logic HIGH when no tooth is near and logic LOW when proximate to a tool of the tooth wheel 210, has no effect on the performance of the system or the control algorithm itself.

In some embodiments various control resistors, such as pull-up resistors, may be used to control the desired output from the sensor 120, as is generally understood in the art. Also, in some embodiments the inductive sensors 120 may be powered from their own power supply or from a rail voltage, such as 5 volts, which is typically present on the controller 110 itself.

In one embodiment the inductive sensors 220 are Cherry Hall effect sensors that have a maximum output frequency of 10 kHz. The corresponding tooth wheel 210 includes parameters such as: a minimum tooth height of 0.200", a minimum tooth width of 0.100", a minimum distance of 0.200" between teeth, and a minimum material thickness of 0.25."

Assuming a maximum trailer speed of 100 mph, the maximum expected output frequency can be calculated based on an implementation having a tire of the trailer wheel 32 diameter of 31" and a trailer linear speed of 100 mph as follows:

Trailer tire circumference=(3.14159*31")=97.4"

(1 revolution/97.4")*(100 miles/hr)*(5280 ft/1 mile)* (12 in/1 ft)(1 hr/3600 sec)=18.1 revolutions/sec (18.1 rev/sec)*(90 teeth/rev)=1626 sensor pulses/ sec=1626 Hz Example Implementation Details As described above, the controller 110 may be implemented by an Analog Devices ADuC831 programmable microcontroller. Proper interfacing of the microcontroller 110 inputs and outputs ensures adequate protection is provided to the microcontroller and that the inputs and outputs will function properly. As is the case with any microcontroller, care must be taken to ensure the voltage levels applied to the input pins do not exceed the maximum allowable voltage and that the outputs do not draw too much current.

The speed sensors 120 are connected to input pins on the controller 110. As is the case with any 8051/8052 compatible microprocessor, these input pins can be configured to be external event counters by using internal timers available within the ADuC831 microcontroller. In other words, the microcontroller can generate a count between high-low transitions and store the counted values in the appropriate timer memory location.

The state of the external event counter pins is checked once per instruction cycle. Because each instruction cycle in the ADuC831 microcontroller is 12 clock cycles long, the microcontroller is only capable of counting events that occur at a maximum of ½4th the rate of the crystal frequency. A common crystal frequency would be 12 MHz, which means the microcontroller can count a maximum of 500,000 events per second.

The speed sensors 120 are being powered by the ADuC831 microcontroller's 5V digital rail so the sensor outputs can be directly connected to the microcontroller input pins without the use of additional protection circuitry. However, at least 660 uA of current should flow from the input pin to ground to pull the speed sensor input port low. The path to ground is made through the output of the speed sensor and once the port is pulled low, the amount of current flowing to ground drops to approximately 40 uA.

The electric trailer brake signal 116 from the tow vehicle 12 is 12 VDC, however the input voltage specifications to the ADuC831 microcontroller specify that the maximum input voltage recommended by the chip manufacturer is 5 VDC. Unlike the speed sensor inputs, additional circuitry is used to protect the microcontroller.

In an example embodiment, a 12 VDC control solid state relay (SSR) 116 provides isolation between the 12V brake light signal from the tow vehicle input 106 and the 5V supply used to power the microcontroller and supply the inputs and outputs with power. When the trailer brakes are being applied by the electric trailer brakes 136 (FIG. 2), power is applied to the 12 VDC input SSR 116, effectively closing the normally open output contact, which allows a 5 VDC signal to flow into the digital input of the microcontroller, resulting in a logic high state. When the trailer brakes are not being applied, current flows out of the input port to pull the input port down to ground. A pull-down resistor can regulate the flow of current from the input port to ground because the ADuC831 microcontroller has internal pull-up resistors at port 0. Unlike a mechanical relay, a solid state relay has no moving parts to wear out or break.

The PWM modulators 150, which may include separate modulators for each of the trailer brakes, can be configured from PWM modulated outputs of the ADuC831 microcontroller. The microcontroller's specification indicates that the outputs can source a maximum of 80 uA, meaning they can only safely deliver a maximum of 80 uA of current to an external device. Because solid state relays typically require a stronger signal to properly operate, additional circuitry can keep the output current of the PWM outputs below the maximum while still providing enough current to drive the solid state relays. A 1:1 op-amp buffer (not illustrated because conventional) increases the amount of current available to the solid state relay inputs, if such relays are used, while keeping the amount of current sourced from the PWM outputs below the maximum rating. The current used by the PWM output relays, if used, can be delivered from the 5V digital rail through the op-amp. The 1:1 ratio refers to the ratio of the opamp's input and output voltage. Because the microcontroller output is 5 VDC and the solid state relays require 5 VDC to operate, a 1:1 ratio is appropriate. A current limiting resistor can be used to keep the output current well below the absolute maximum of the port.

When the digital output port from the PWM modulators 150 goes high, power is applied to the solid state relay, effectively opening the output contact, thus interrupting the flow of power from the brake control signal 116 from the tow vehicle 12 to the trailer brakes 136. The rate at which the flow of power to the trailer brake is interrupted is controlled by the duty cycle and frequency of the PWM modulators 150.

There are a number of PWM modes available in the ADuC831 including single variable resolution, twin 8-bit, twin 16-bit, as well as dual 8-bit. The pulse width modulation mode selected for this implementation is twin 16-bit mode. In this mode, the frequency of the pulse width is fixed at 244 Hz while the duty cycle of each PWM modulator 150 output is independently programmable.

Within the PWM modulator 150, a PWM counter is fixed to count from 0 to 65536, yielding a fixed 16-bit PWM output. Because the maximum count is fixed at 65536, the frequency of the pulse width modulation is fixed at 244 Hz when operating from the 16 MHz core clock. When the PWM counter in the PWM modulator 150 is less than the configured value of a programmable level PWM0H/L, the output of PWM0 is HIGH. After the PWM counter equals PWM0H/L, the output goes LOW and remains LOW until the PWM counter reaches 65536 and rolls back over to 0, which makes the output HIGH again.

If there are two PWM modulators 150, the second modulator is similarly configured. By controlling the values of PWM0H/L and PWM1H/L, the duty cycle of each PWM modulator 150 output can be configured, which ultimately controls the trailer brakes 136.

A 50% pulse width modulation duty cycle yields a digital pulse train that is high for 50% and low for 50% of the time, thus reducing the total power delivered to the particular trailer brake 136 by half. When the PWM duty cycle is 80%, the PWM output is high for 80% of the time and low for 20% of the time, thus reducing the amount of power delivered to the trailer brake by 80%, assuming normally closed solid state relays are used on the outputs of the PWM modulators 150. As can be seen, the decrease in braking force at each wheel is directly proportional to the duty cycle of the pulse width of the brake signal out 130.

Figure 4:
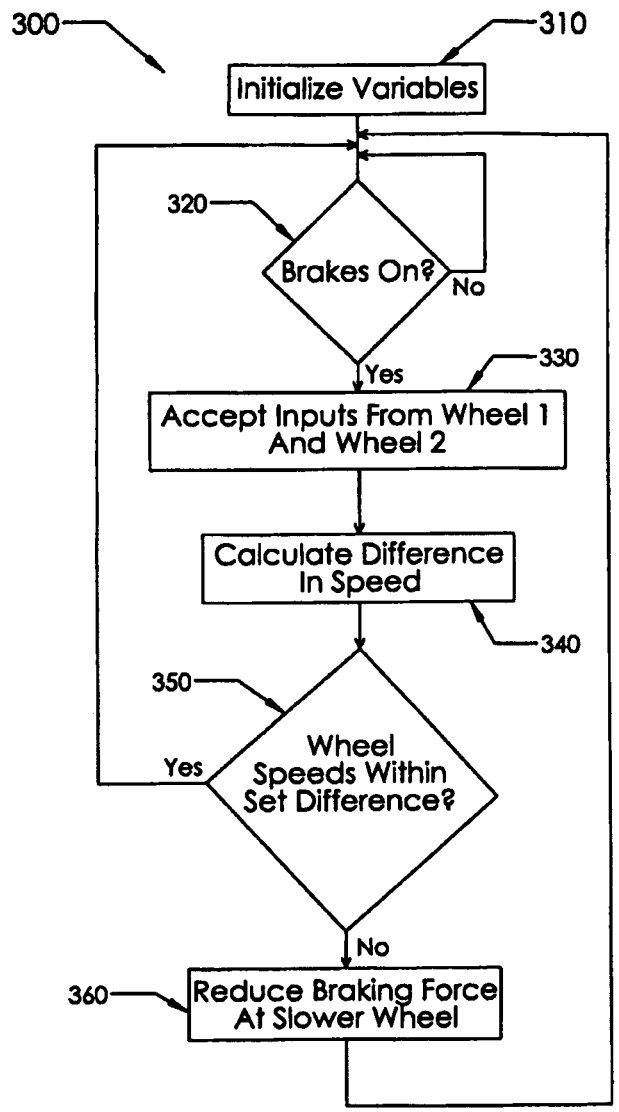
FIG. 4 is an example flow diagram illustrating a control flow for a trailer brake ABS system according to embodiments of the invention.

FIG. 4 is an example flow diagram that illustrates an example control flow 300 used by embodiments of the invention to provide anti-lock brake control.

The control flow 300 begins with an initialization process 310. In this process, names are assigned to the inputs and outputs being used by the program, if a programmed controller is being used as the controller 110. Assigning names to the inputs and outputs used in the program simplifies the programming that follows the initialization process 310. Also, counters and other variables are initialized to zero or to other initial values.

In a process 320 the control flow 300 determines if the brakes in the tow vehicle 12 (FIG. 1) are being applied. If the brakes are not being applied the control flow 300 exits the process 320 in the NO direction and simply loops back to the process 320 where the braking condition is checked again. When the brakes are not applied the process 320 continues to loop. Instead, when the brakes are being applied, i.e., there is a brake signal being output from the electric trailer brakes 136 (FIG. 2), the control flow 300 exits the process 320 in the YES direction to a process 330.

In the process 330 inputs from the wheel speed sensors 120 (FIG. 2) are accepted and analyzed in a process 340 to determine if the wheels are spinning at the same speed. In one embodiment this process is performed by the skid detector or detectors 144 (FIG. 2). Specifically, the skid detectors 144 count speed sensor pulses from the wheel speed sensors 120. In the embodiment using a 16-bit timer, described above, the timers will overflow when their value reaches 65,536 and, using a 16 MHz clock it takes 0.05 seconds for one of the timers to count from 0 to 46,080. First and second timers may be initialized to begin at different numbers before the counting starts. The skid detectors 144 counts speed sensor pulses for approximately 0.05 seconds. Assuming a maximum towing speed of one hundred miles per hour, this equates to a maximum of approximately 212 speed sensor pulses per 0.05 second increment. In some embodiments, based on bit depth, only the low bytes of both timers are used to store the wheel speed sensor pulse counts.

Once the 0.05 second delay has been executed the control flow 300 enters a wheel speed comparison process 350.

In the wheel speed comparison process 350, the speed sensor counts from each wheel speed sensor 120 (FIG. 2) are compared to determine if they are within a set tolerance level of speed. In this description this condition is referred to as being equal. In other words, if the two wheels are within, for example, 5% of each other's speeds, that is considered equal for purposes of process 350. If they are equal, both wheels are slowing down at an equal rate and the control flow 300 exits process 350 in the YES direction and returns to the comparison process 320 to determine if the brakes have been released. If instead the speed sensor counts are not equal, one of the trailer wheels is turning slower than the other. In such a case, the control flow 300 exits in the NO direction to a process 360.

As described above, when one wheel is slowing down faster than the other, the slower wheel is on the verge of locking up. When this occurs, the amount of current delivered to the slower wheel's electric brake is reduced to prevent excess wheel slip as necessary. Although it may possible that both wheels lock up together, this condition is unlikely due to variations in the road surface, uneven trailer weight distribution, varying brake adjustments, tire pressure differences, and irregular brake pad wear.

In some embodiments, to eliminate the condition of both wheels skidding simultaneously, the microcontroller 110 or other ABS controller can store previous speed data readings to establish an average wheel speed over a fixed period of time. If, for example, the last five speed sensor data blocks collected show an average speed of 100 pulses per 0.05 second block and the current sensor data shows both wheels are at a zero speed, it is extremely likely that the wheels have locked up. In such a condition the braking force of both wheels are reduced until they come back up to speed.

Once the control flow 300 has determined a wheel is locking up it proceeds to the process 360, which reduces the braking force at the slower wheel, which is the skidding wheel. In a particular digital embodiment the percent difference in wheel speeds calculated by the process 340 is divided by 10, then multiplied by 25, has 5 added to it to yield a number between 0 and 255. The result is a determination on a scale that is directly proportional to the percent difference in speed between the two wheels.

The methods of any such calculation may affect the precision of the comparison between the wheelspeeds in the comparison process 350. In some embodiments, if unsigned integer math is used to calculate the percent difference, the calculation will ignore a speed difference of less than 10%. Calculating the difference in wheelspeed using floating point calculations would provide greater precision in the control flow 300.

After the difference in wheelspeeds has been calculated in the process 340, the braking force of the slower-spinning wheel is reduced in a process 360. In some embodiments the reduction of force is directly proportional to the difference in wheel speeds that was calculated in the process 340. As described above, one method of reducing braking force is by using a PWM modulating circuit 150 (FIG. 2), but other methods to reduce force are equally acceptable, such as by using integrating amplifiers or other counters, for instance. In other embodiments the reduction in braking force is not proportional to the difference in wheel speeds, but by a greater or lesser force, depending on particular implementation needs.

After the braking force has been reduced for the slower-turning wheel in the process 360, the control flow 300 returns back to the process 320 where the control flow once again determines if the brakes are being applied, and the entire control flow 300 repeats. In some embodiments one or more of the processes 330, 340, 350, and 360 have finite time limits in which they operate. In other words, the process 330 may accept wheel speed inputs for only 0.05 seconds. Reducing the length of the comparison will reduce the amount of time the microcontroller 110 needs to compare wheel speeds and make corrections as needed. However, increasing the comparison time increases the accuracy of the data at lower speeds, providing for a more accurate comparison of wheel speed as the tow vehicle slows down. Empirical testing by the system implementer may be necessary to determine an optimum comparison time.

In another example, the process 360 reduces the braking force for only a given period of time, such as 0.01, 0.05, 0.1, or 0.5 seconds before looping back to check the brake condition again in the process 320. Again, the system implementer may choose the optimum duration for brake pressure reduction.

During normal braking, the trailer brakes operate as if there is no ABS system 10 (FIG. 1) present. However, once the microcontroller 110 identifies impending wheel lockup, it takes over and pulses the effected brake as needed to prevent wheel slip. As previously mentioned, the duty cycle of the pulse width modulated signal used to prevent slip may be directly proportional to the difference in speed between the two wheels.

Using normally closed relays at the output of the PWM modulators 150 (FIG. 2), as described above, was chosen in the interest of safety. If for some reason the microcontroller 110 fails and is no longer able to pulse the trailer brakes 136 as required to eliminate slip, the signal 106 from the tow vehicle electric trailer brakes 136 will pass directly through the output of the relays and the trailer brakes 136 will still function as if the ABS system 10 were not present.

Although the communication signals between the microcontroller 110 and other components were described as being electrical signals, other embodiments can use other types of signaling. For example, the safety of the microcontroller 110 and its inputs and outputs can be increased by isolating all inbound and outgoing signals from the board I/O using opto-isolators. Opto-isolators use the transfer of light between elements of a circuit to transfer the input signal to the output while keeping the elements themselves electrically isolated. The utilization of opto-isolators would protect the microcontroller 110 from shorts to power and ground voltages, excessive signal noise, improper input voltages, and static discharge off board, for example.

In yet other embodiments the function of using a signal from the tow vehicle electric trailer brakes 136 as described above with reference to FIG. 2 can be eliminated by instead using an accelerometer. Accelerometers are devices that generate a signal proportional to acceleration (and deceleration) in one or more axes. In a particular embodiment the accelerometer output is connected to the microcontroller 110 that can interpret such accelerometer output and use the output to control the trailer brakes 136.

In another example implementation the control flow 300 of FIG. 4 can purposefully allow a desired level of wheelslip rather than, as described above, completely eliminating wheel slip as needed to balance the speed of the two wheels. Such a control flow would push the braking force to the point where a wheel begins to lock up, reduce the braking force, then increase the braking force again as necessary to maintain the desired level of slip. The optimum amount of slip for this application could be obtained through thorough system testing and data analysis.

Various other modifications and enhancements can be made to the above-described system without deviating from the scope of the invention.

Although particular systems to implement a trailer brake ABS system have been described above, it is not intended that such specific references be considered as limitations upon the scope of this invention except in-so-far as set forth in the following claims.

What is claimed is:

1. An electronic anti-lock brake controller for a trailer towed by a vehicle, comprising:
   a trailer brake signal input structured to accept a braking input signal;
   at least two wheel speed sensors, each sensor structured to generate a signal related to a speed of a respective wheel of the trailer;
   a comparator structured to compare individual speeds from the wheel speed sensors to one another, and then compare a difference in wheel speed to a difference threshold;
   a controller structured to generate a reduced brake signal; and
   a brake signal interrupt structured to supply the reduced brake signal instead of the braking input signal to a slowest of the wheels of the trailer, while continuing to supply the braking input signal to at least one of the other wheels of the trailer, the selection based on a comparator output.

2. The anti-lock brake controller of claim 1 in which an amount of difference between the braking input signal and the reduced brake signal is proportional to a difference in the individual speeds from the wheel speed sensors.

3. The anti-lock brake controller of claim 1 in which the controller is structured to generate the reduced brake signal when the comparator determines that the individual speeds from the one or more wheel speed sensors differ by greater than a threshold amount.

4. The anti-lock brake controller of claim 3 in which the threshold is ten percent.

5. The anti-lock brake controller of claim 1 in which the controller comprises a Pulse Width Modulator.

6. The anti-lock brake controller of claim 1, further comprising:
   a second comparator structured to determine if more than one trailer wheel is skidding.

7. A modular anti-lock brake controller, comprising
   a first connection for coupling to a tow vehicle output plug;
   a second connection for coupling to a trailer input plug;
   a pass through section of the controller for passing light signals from the tow vehicle output plug to the trailer input plug; and
   a wheel lock prevention system, including:
     at least two wheel speed sensors, each sensor structured to generate a signal related to a speed of a respective wheel of the trailer,
     a comparator structured to compare speed signals from the at least two wheel speed sensors to one another, and to generate an anti-lock brake signal if a difference between the speed signals exceeds a threshold amount, and
     a trailer brake control output structured to apply the anti-lock brake signal to a slowest of the wheels of the trailer while not applying the anti-lock brake signal to the other wheels of the trailer.

8. The anti-lock brake controller of claim 7, further comprising a pass-through brake signal section structured to pass through a brake signal from the tow vehicle output plug to at least one trailer wheel at times when the difference between the speed signals is below the threshold amount.

9. The anti-lock brake controller of claim 8 in which the new brake signal is a modified signal from the tow vehicle output plug.

10. The anti-lock brake controller of claim 9 in which the comparator comprises a Pulse Width Modulator.

11. The anti-lock brake controller of claim 7 in which the wheel lock prevention system further comprises a brake signal generation device that generates a brake signal, and in which the trailer brake control output is structured to apply either the brake signal or the anti-lock signal based on the comparator output.

12. A modular anti-lock brake controller for electric trailer brakes, comprising:
    a first connection for coupling to a standard tow vehicle output plug;
    a second connection for coupling to a standard trailer input plug;
    at least two wheel speed sensors, each wheel speed sensor coupled to a respective trailer wheel; and
    a programmed microcontroller including:
        inputs structured to receive at least two wheel speed signals;
        a comparator process structured to determine relative wheel speeds from the wheel speed signals,
        an anti-lock generating process structured to generate an anti-lock electric brake signal when the comparator process determines the relative wheel speeds differ by a threshold amount, and
        one or more outputs structured to apply the electric anti-lock brake signal to the slowest of the trailer wheels.

13. The modular anti-lock brake controller of claim 12 in which the anti-lock generating process comprises a Pulse Width Modulation process.

14. The modular anti-lock brake controller of claim 13 in which the anti-lock generating process is structured to modify a tow vehicle brake signal from the first connection by controllably reducing a power output of the tow vehicle brake signal.

15. The modular anti-lock brake controller of claim 12 in which the programmed microcontroller further comprises a switching circuit structured to control whether a brake signal from the tow vehicle output plug or the electric anti-lock brake signal is applied to the at least one trailer brake.

16. A method of applying an electric brake signal to a set of wheels on a trailer using a processor and a pulse width modulator (PWM), the method comprising:
    accepting a braking signal in the processor;
    measuring speeds from at least two wheels on the trailer;
    providing the measured wheel speeds to the processor;
    in the processor, comparing the speeds of the at least two wheels to one another to generate a wheel speed difference;
    when the wheel speed difference exceeds a threshold, reducing the braking signal by the PWM modulator; and
    applying the reduced braking signal to the slower of the at least two wheels, while passing the unmodified braking signal to at least one other of the at least two wheels.

17. The method of claim 16 in which accepting a braking signal comprises accepting a braking signal from a tow vehicle coupled to the trailer.

18. The method of claim 17 in which accepting a braking signal comprises accepting a braking signal from a device that detects deceleration.

19. The method of claim 16 in which reducing the braking signal comprises generating a Pulse Width Modulated signal.

20. A modular anti-lock brake controller for electric trailer brakes, comprising:
    a first connection for coupling to a standard tow vehicle output plug;
    a second connection for coupling to a standard trailer input plug;
    at least two wheel speed sensors, each wheel speed sensor coupled to a respective trailer wheel; and
    a programmed microcontroller including:
        inputs structured as external event counters to receive at least two wheel speed signals and generate a first count and a second count that respectively represent a first and a second wheel speed;
        a comparator process structured to determine relative wheel speeds from the wheel speed signals,
        an anti-lock generating process structured to generate an anti-lock electric brake signal by Pulse Width Modulation when the comparator process determines the relative wheel speeds differ by a threshold amount, and
        one or more outputs structured to apply the electric anti-lock brake signal to the slowest of the trailer wheels.

21. The anti-lock brake controller of claim 20 in which generating the anti-lock electric brake signal by Pulse Width Modulation is controlled by setting the duty cycle of a Pulse Width Modulator.

22. The anti-lock brake controller of claim 21 further comprising a normally-closed relay coupled to the Pulse Width Modulator.

23. The anti-lock brake controller of claim 20 in which the programmed microcontroller is structured to store previous speed data readings to establish an average wheel speed.

24. The anti-lock brake controller of claim 20 in which the anti-lock brake signal is applied for only a set duration before the relative wheel speeds are re-determined.

\* \* \* \* \*